(12) United States Patent
Zendath

(10) Patent No.: US 9,108,491 B2
(45) Date of Patent: Aug. 18, 2015

(54) BLIND ARRANGEMENT FOR A MOTOR VEHICLE

(75) Inventor: Thomas Zendath, Metzingen (DE)

(73) Assignee: WEBASTO SE, Stockdorf (DE)

(*) Notice: Subject to any disclaimer, the term of this patent is extended or adjusted under 35 U.S.C. 154(b) by 777 days.

(21) Appl. No.: 12/671,651

(22) PCT Filed: Aug. 26, 2008

(86) PCT No.: PCT/DE2008/001410
§ 371 (c)(1),
(2), (4) Date: Mar. 4, 2010

(87) PCT Pub. No.: WO2009/026904
PCT Pub. Date: Mar. 5, 2009

(65) Prior Publication Data
US 2011/0226426 A1    Sep. 22, 2011

(30) Foreign Application Priority Data

Aug. 31, 2007   (DE) .......................... 10 2007 041 298

(51) Int. Cl.
*B60J 1/20*  (2006.01)
*B60J 7/00*  (2006.01)
(Continued)

(52) U.S. Cl.
CPC .............. *B60J 7/0015* (2013.01); *B60J 1/2063* (2013.01); *B60J 1/2066* (2013.01); *E06B 9/08* (2013.01); *E06B 9/58* (2013.01); *E06B 9/581* (2013.01)

(58) Field of Classification Search
CPC ............. E06B 9/58; E06B 9/08; E06B 9/581; B60J 1/2052; B60J 1/2066; B60J 1/2063

USPC ......... 160/23.1, 262, 265, 266, 267.1, 268.1, 160/270, 271, 272, 273.1, 370.22
See application file for complete search history.

(56) References Cited

U.S. PATENT DOCUMENTS 2,204,739 A * 6/1940 Wells ........................... 160/23.1
3,017,927 A * 1/1962 Demko ......................... 160/271
(Continued)

FOREIGN PATENT DOCUMENTS

DE         25 24 736 A1    12/1976
DE         102 04 331       8/2003
(Continued)

OTHER PUBLICATIONS

Office Action for Chinese Application No. 200880104634.4, received on Apr. 28, 2012.

*Primary Examiner* — Katherine Mitchell
*Assistant Examiner* — Johnnie A Shablack
(74) *Attorney, Agent, or Firm* — Marshall, Gerstein & Borun LLP

(57) ABSTRACT

A blind arrangement for a motor vehicle, especially for a vehicle roof, comprising at least one blind web that encompasses one respective guiding strip along the lateral edge regions thereof. The guiding strip is designed as a force spring, extends along the direction of extension of the blind web, is guided within a guiding track of a guide rail, and shapes the blind web into a wound member once the blind web has left the guiding track that extends in the direction of extension and stretches the blind web transverse to the direction of extension. According to the invention, the wound member has a winding shaft that runs transversely to the direction of extension of the blind web and is disposed at the level of the guiding tracks located on both sides.

20 Claims, 18 Drawing Sheets

(51) Int. Cl.
*E06B 9/58* (2006.01)
*E06B 9/08* (2006.01)

(56) References Cited

U.S. PATENT DOCUMENTS

| | | | | |
|---|---|---|---|---|
| 3,420,467 | A | * | 1/1969 | Bell .......................... 242/118.3 |
| 4,825,921 | A | * | 5/1989 | Rigter ........................ 160/23.1 |
| 6,309,076 | B1 | * | 10/2001 | McVicker .................... 359/601 |
| 6,523,770 | B2 | * | 2/2003 | Peeters ........................ 242/376 |
| 7,114,766 | B2 | * | 10/2006 | Becher et al. ................. 296/214 |
| 7,744,151 | B2 | * | 6/2010 | Jansen et al. ................. 296/214 |
| 7,793,702 | B2 | * | 9/2010 | Biewer et al. ............ 160/370.22 |
| 7,950,440 | B2 | * | 5/2011 | Rockelmann et al. ...... 160/273.1 |
| 8,430,148 | B2 | * | 4/2013 | Thalhammer et al. ....... 160/23.1 |
| 8,474,510 | B2 | * | 7/2013 | Nellen et al. ............ 160/370.22 |
| 8,516,728 | B2 | * | 8/2013 | Jung ................................ 40/610 |
| 8,590,593 | B2 | * | 11/2013 | Kitani et al. ............ 160/370.22 |
| 8,690,234 | B2 | * | 4/2014 | Rockelmann et al. ........ 296/214 |
| 8,740,294 | B2 | * | 6/2014 | Rockelmann ................. 296/214 |
| 2005/0236117 | A1 | * | 10/2005 | Lin ............................ 160/267.1 |
| 2007/0175603 | A1 | * | 8/2007 | Lin ............................ 160/273.1 |
| 2008/0197655 | A1 | * | 8/2008 | Oerke et al. ..................... 296/83 |
| 2009/0145559 | A1 | * | 6/2009 | Glasl et al. ................. 160/273.1 |
| 2009/0178771 | A1 | * | 7/2009 | Lin .......................... 160/370.22 |
| 2012/0187725 | A1 | * | 7/2012 | Rockelmann et al. ........ 296/219 |
| 2013/0186578 | A1 | * | 7/2013 | Lin ............................... 160/271 |

FOREIGN PATENT DOCUMENTS

| | | |
|---|---|---|
| DE | 102 43 068 | 3/2004 |
| DE | 20 2005 006 415 | 6/2005 |
| DE | 10 2005 024 657 | 6/2006 |
| DE | 10 2005 048 207 | 11/2006 |
| DE | 20 2007 005 U1 | 6/2007 |
| EP | 1 495 888 | 1/2005 |
| FR | 2 779 474 | 12/1999 |
| WO | 96/01191 | 1/1996 |
| WO | 2007/059755 | 5/2007 |

* cited by examiner

BLIND ARRANGEMENT FOR A MOTOR VEHICLE

BACKGROUND OF THE INVENTION

1. Field of the Invention

The invention relates to a blind arrangement for a motor vehicle, in particular for a vehicle roof.

2. Related Technology

A blind arrangement of this type is for example known from DE 10 2005 024 657 A1 and serves to shadow a transparent bodywork surface arranged, in particular, in a roof region of a vehicle. The known blind arrangement comprises a blind sheet which can be wound up on a winding tube and unwound therefrom and is guided in guide rails along its lateral edges extending in the direction of extension. For guiding in the guide rails, the blind sheet has in its edge regions in each case an edge stiffener which is formed from a metal strip, is a constant force spring and engages with a guide track of the respective guide rail. The constant force springs automatically wind up in a helical manner in a region arranged on the tail side outside the guide tracks of the guide rails. In the process, a tensile force acting in the winding-up direction is exerted on a pulling bow which extends at the front-side end of the blind sheet in the transverse direction of the vehicle and is also guided in the lateral guide rails.

A blind arrangement of the type mentioned at the outset is also known from DE 20 2005 006 415 U1. This blind arrangement also comprises a blind sheet which is provided at its external edges in each case with a helical spring. The helical springs are each guided in a guide rail arranged along a respective longitudinal edge of a roof opening of the motor vehicle in question. A winding-up aid for the blind sheet is arranged in each case on the tail side from the guide rails. The winding-up aid is in the form of a surface which is curved in the winding direction and on which the respective helical spring is guided during winding-up and unwinding of the web sheet.

In the blind arrangements according to the prior art as described hereinbefore, there is the drawback that the web sheet does not experience, in the region of the winding or the winding body, any tension in the transverse direction of the vehicle. This entails the risk in this region of a formation of folds which can become apparent on the material; this may, in turn, be visible from the interior of the vehicle in the closed position of the blind.

Furthermore, during preassembly of the blind arrangement in a motor vehicle or else in a sliding roof system, there is the problem that the blind sheet can become ruffled, in the region of its winding, inward, i.e. in the direction of the center plane of the blind arrangement. Again, this can lead to damage to the blind arrangement. In particular, the constant force spring and also the blind sheet can become damaged as a result.

A defined winding behavior is ensured in these blind arrangements by a winding core, such as a rotatably mounted winding shaft. However, components of this type are associated with additional costs and can furthermore also cause an undesirable formation of noise on actuation of the blind arrangement. Furthermore, moving components also frequently give rise to technical problems.

GENERAL DESCRIPTION

The invention provides a blind arrangement of the type above with optimized blind tensioning properties.

Accordingly, the invention provides a blind arrangement for a motor vehicle, in particular for a vehicle roof, with at least one blind sheet comprising along its lateral edge regions in each case a guide strip which is embodied as a force spring, extends along the direction of extension of the blind sheet, is guided in a guide track of a guide rail that extends in the direction of extension and tensions the blind sheet transversely to the direction of extension, and shapes the blind sheet into a winding body after leaving the guide track, characterized in that the winding body has a winding axis which extends transversely to the direction of extension of the blind sheet and is arranged, based on the longitudinal extension of the guide rails, at the level of the guide tracks arranged on both sides.

A blind arrangement for a motor vehicle, in particular for a vehicle roof, is thus provided that comprises at least one blind sheet comprising along its lateral edge regions in each case a guide strip which is embodied as a force spring, extends along the direction of extension of the blind sheet, is guided in a guide track of a guide rail that extends in the direction of extension and tensions the blind sheet transversely to the direction of extension, and shapes the blind sheet into a winding body after leaving the guide track. The winding body has a winding axis which extends transversely to the direction of extension of the blind sheet and is arranged at the level of the guide tracks arranged on both sides. Thus, the blind sheet is kept, over its entire region which is unwound from the winding body, tensioned or taut transversely to the direction of extension. The risk of a formation of folds is thus minimized, even at the level of the winding body. As a result of the lateral guidance for tensioning the blind sheet transversely to the direction of extension up to the level of the winding region, the advantages of the lateral guidance are obtained there too. The material is thus tensioned effectively, lending an attractive appearance to the blind sheet over the entire extension length. Flapping of material can be kept low or else ruled out by the configuration according to the invention. The risk of a formation of folds is minimized. This also allows the risk of folds becoming apparent in the visible region of the web sheet to be ruled out. The defined tension in the transverse direction of the vehicle substantially also rules out the risk of the occurrence during travel of noises caused by flapping of the web sheet or the like.

In the blind arrangement according to the invention, the winding axis is therefore arranged with respect to the guide rails in such a way as to intersect the guide rails during projection in the vertical direction of the vehicle. The term "at the level" is therefore to be understood in its broadest sense and relates not to the relative vertical position of the components in question based on the vertical direction of the vehicle, but rather to the relative position of the components in question in the longitudinal direction of the vehicle.

The lateral guidance also ensures that the edges or the edge regions of the blind sheet that are provided with the constant force springs slide in the winding region, during transportation, assembly or else during operation, in the direction of the center plane of the blind arrangement and cause ruffling of the blind sheet. Rotatable components for mounting the winding body are not necessarily required.

Furthermore, the embodiment according to the invention of a blind arrangement also allows the overall space available in the region of a vehicle roof to be utilized more effectively, as the winding region can be positioned independently of the height of the guide in the visible region of the blind. A highly curved course of the force spring between the visible region and the winding region can be implemented.

Furthermore, it is possible to provide the blind arrangement as a ready-assembled module, as the winding region, i.e. the region in which the constant force springs are wound up, can also be preassembled.

In a preferred embodiment of the blind arrangement according to the invention, the guide tracks have in each case a guide surface, which is substantially curved in the direction of extension, for the blind sheet adjoining the winding body, the curvature of the guide surface being in the same direction as the winding of the winding body. Guide surfaces of this type promote the winding behavior of the blind sheet or of the force springs which are embodied, in particular, as helical springs, as the force spring is bent in the winding direction by the guide track.

In order to be able to arrange the winding body in an overall space-optimized manner for a specific type of vehicle without fundamentally altering the embodiment of the blind arrangement, the guide tracks are formed in each case at the level of the winding axis in an end-side attachment of the guide rail that is arranged on an end side of a guide rail portion which is substantially straight in its embodiment. The attachment is in particular a plastics material injection-molded part, the geometry of which can vary greatly in accordance with the requirements of each individual case. The portion of the guide rail that is substantially straight in its embodiment is in particular an aluminum extruded profile. It is of course also conceivable for the guide rail portion which is substantially straight in its embodiment and an end portion corresponding to the attachment to be produced in one piece, then as a plastics material injection-molded part, for example.

The term "substantially straight in its embodiment", used in the present case in relation to the guide rail portion, also includes guide rails which have a slight curvature, following the respective course of the vehicle roof, for example, in the direction of extension of the web sheet, i.e. in which a large radius of curvature is present.

For overall space optimization, the guide tracks can in particular be formed in each case, at the level of the winding axis, from an inner shell based on the winding axis and an outer shell based on the winding axis, which shells are in each case curved in a substantially S-shaped manner in the vertical direction of the vehicle and correspond to or border webs which delimit the respective guide track in the region of the substantially straight guide rail portion on both sides.

In a preferred embodiment, the outer shell, which is preferably surrounded by the web sheet, borders the corresponding web of the substantially straight guide rail portion. This ensures that the guide track is formed without interruption; this, in turn, ensures the tensioning of the web sheet in the transverse direction of the vehicle and thus an attractive appearance.

The thickness of the outer shell of the attachment, which shell is surrounded by the web sheet, can decrease in the direction remote from the guide rail portion, i.e. in the direction of the tail of the vehicle. The outer shell then tapers therefore in the direction of its free end side based on the vertical direction of the vehicle. In order nevertheless to keep the web sheet in this case tensioned, in the region of its winding body, transversely to the direction of extension or in the transverse direction of the vehicle, the edge of the outer shell that is arranged on the outside based on the longitudinal center plane of the vehicle then has, between the region adjoining the guide rail portion and the tail-side end side, preferably a course away from the longitudinal center plane of the vehicle. In particular, the edge of the outer shell that is arranged on the outside based on the longitudinal center plane of the vehicle can have a substantially S-shaped course based on the transverse direction of the vehicle. This can be implemented in that the width of the outer shell increases. The external edge of the inner shell can run parallel to the outer edge of the outer shell.

For precisely guiding the winding of the helically winding-up force springs, the attachments can have in each case a lateral abutment surface for the respectively corresponding edge region of the winding body.

In order to be able to define an arching of the winding body and/or also to be able to define a winding behavior which is as taut as possible, it is advantageous if the abutment surface has a normal which is set in relation to the transverse direction of the vehicle in the direction of the front end of the vehicle and/or in the vertical direction. Setting the normal in the direction of the front end of the vehicle by 1° to 10°, for example, causes the respective constant force spring to be wound up so as to follow substantially a cone surface; this ensures sufficient tensioning of the blind sheet in the region of the winding body and prevents breaking-out of the blind regions provided with the constant force springs in the direction of the longitudinal center plane of the vehicle during winding of the winding body formed from the blind sheet. By setting the normal of the abutment surface in the vertical direction, it is possible to define an arching of the winding body that can correspond to an arching or dishing of the vehicle roof in question.

In order to prevent the spring force from yielding or breaking out in the direction of the longitudinal center plane of the vehicle during winding of the winding body, a support surface for the region of the winding body that has the constant force spring can be provided on the inner shell of the guide track, at the level of the winding axis or the winding body, in a region facing the longitudinal center plane of the vehicle. The support surface holds the external windings of the force spring in track; this, in turn, benefits the winding behavior of the blind arrangement.

The support surface is, for example, formed from a bevel formed on the side of the inner shell that faces the winding body. However, alternatively, the support surface can also be formed by a vertical collar or web formed on the inner shell.

In order to further assist the winding-up of the force springs, a winding element for the winding body can be provided in the region of the winding axis. The winding element is for example a bolt or pin which can be provided with an end plate for guiding the respective force spring on the inside. The bolt or pin can however also be frustoconical in its embodiment and widen in the direction of the longitudinal center plane of the vehicle, so that the respective force springs are outwardly held with their internal windings based on the longitudinal center plane of the vehicle.

Furthermore, the function of the winding element can be optimized in that it comprises a rotatably mounted element in the region of the force spring. For example, the bolt or pin mentioned hereinbefore is rotatably mounted. The rotatably mounted element can however also be a sleeve mounted on a bolt or pin.

In order to be able to precisely position the attachment, which is arranged at the level of the winding axis of the winding body of the blind sheet, in relation to the guide portion which is substantially straight in its embodiment, it can have positioning pins via which the attachment can be inserted into the substantially straight guide rail portion and which engage with corresponding recesses or channels, which are delimited by webs, of the guide portion in question, which is substantially straight in its embodiment.

Furthermore, for fixing to the vehicle construction, the attachment can have at least one fixing lug. The fixing lug can for example have a hole, in particular in the form of a slot, for fastening the attachment to the vehicle construction by means of a screw.

In order to ensure that the attachment does not collide with a drive cable of a roofer opening system, it is possible to provide on the attachment a guide channel for the drive cable that is aligned with a guide channel, provided for the drive cable, on the substantially straight guide rail portion.

In a specific embodiment of the blind arrangement according to the invention, at least one winding aid, which interacts exclusively and in direct contact with the blind sheet, is arranged distributed over the extension of the winding body, set apart from the force springs. By shaping the at least one winding aid, which is in particular embodied so as to be roughly U-shaped or semicircular or semielliptical in cross section, in adaptation to the respective requirements, it is possible to define the cross-sectional shape of the winding body in the wound-up state over the extension thereof transversely to the winding direction. For example, the winding body can be flattened by suitably shaping the preferably plurality of winding aids, so that the overall space required in the vertical direction of the vehicle can be minimized in the region of the vehicle interior.

In a specific embodiment of the blind arrangement according to the invention, the winding aids are three-dimensionally contoured over the extension of the winding body, in particular arranged in an arcuate or arched manner, so that the blind sheet can be wound up to form a winding core-free, arcuate winding body.

Further advantages and advantageous configurations of the subject-matter of the invention may be inferred from the description, the drawings and the patent claims.

BRIEF DESCRIPTION OF THE DRAWINGS

Exemplary embodiments of a blind arrangement are illustrated in schematically simplified form in the drawings and will be described in greater detail in the subsequent description. In the drawings.

DETAILED DESCRIPTION

Figure 1:
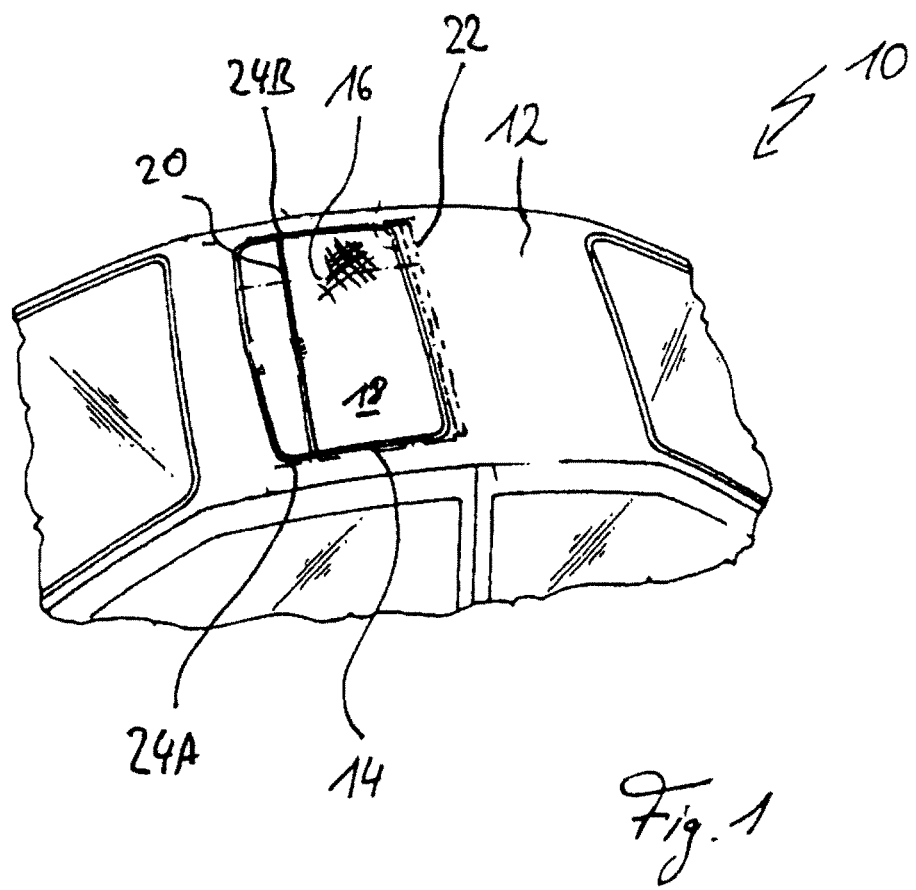
FIG. 1 is a schematic plan view onto a vehicle roof.
Figure 2:
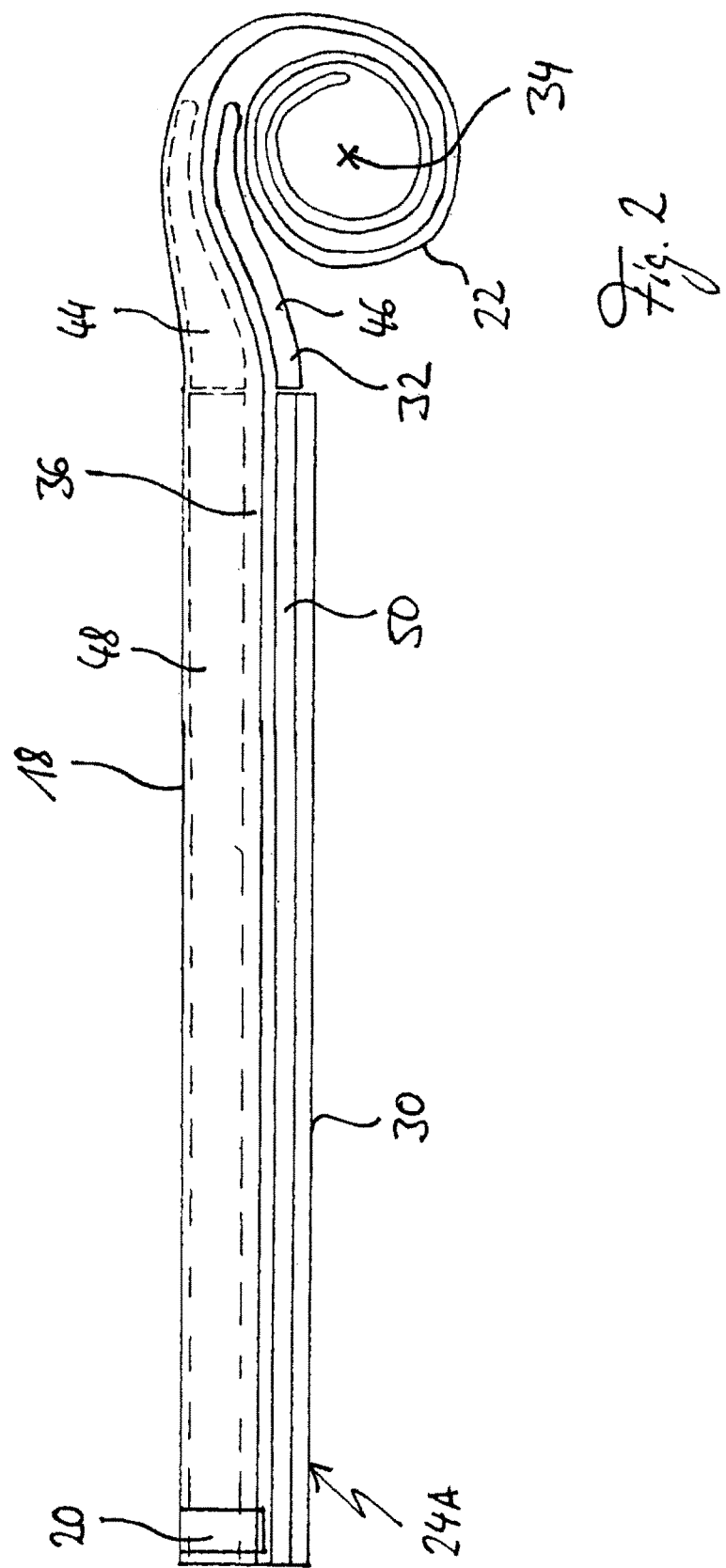
FIG. 2 is a side view of a guide rail of a blind arrangement of the vehicle roof.

FIG. 1 shows a motor vehicle 10 with a vehicle roof 12 which is provided with a roof cutout 14 which can be closed by means of a transparent cover element (not shown here in greater detail).

For shadowing the roof cutout 14, the vehicle roof 12 comprises a blind arrangement 16 (shown) which can be electrically actuated in a manner not shown in greater detail and has a blind sheet 18 which at its leading end is delimited by a pulling bow 20 and on the tail side can be wound up to form a winding body 22. At its lateral edges, the blind sheet 16 is guided in each case in a guide rail 24A or 24B.

As may be seen from FIGS. 2 to 9, the blind sheet 18 has, for guiding in the guide rails 24A and 24B, in its lateral edge regions in each case an edge stiffener 26 which is sewn into an edge pocket 28 of the blind sheet 18 and is a guide strip which is a constant force spring. The edge stiffener or the constant force spring 26 seeks inherently to helically wind up, so that regions of the constant force springs that are positioned outside the guide rails 24A and 24B exert a tensile or opening force on the blind sheet 18. The blind sheet 16 of the embodiment described in the present document therefore seeks to automatically wind up to form the winding body 22. This is counteracted by suitable opposing forces which are introduced on the pulling bow 20 and/or in the lateral guide regions of the blind sheet 18.

The guide rails 24A and 24B are embodied mirror-symmetrically to each other with respect to the longitudinal center plane of the vehicle and will therefore be described hereinafter only with reference to the guide rail 24A arranged on the left in the direction of travel.

The guide rail 24A comprises a straight guide rail portion 30 extending substantially along a lateral edge of the roof cutout 14 and also an attachment 32 which adjoins the straight guide rail portion 30 on the tail side and is arranged at the level of a winding axis 34 of the winding body 22.

Formed in the straight guide rail portion 30 and the tail-side attachment 32 is a guide track 36 in which the constant force spring 26 is guided, which is connected at its leading end, i.e. the end pointing in the direction of the front end of the vehicle, to the pulling bow 20.

At the tail-side end of the guide rail 24A or the attachment 32, the edge region of the blind sheet 18 that has the constant force spring 26 leaves the guide rail 24A, so that as a result of the biasing of the constant force spring 26 when the pulling bow 20 is retracted, i.e. during clearing of the roof cutout 14, the blind sheet 18 automatically winds up to form the winding body 22.

Figure 3:
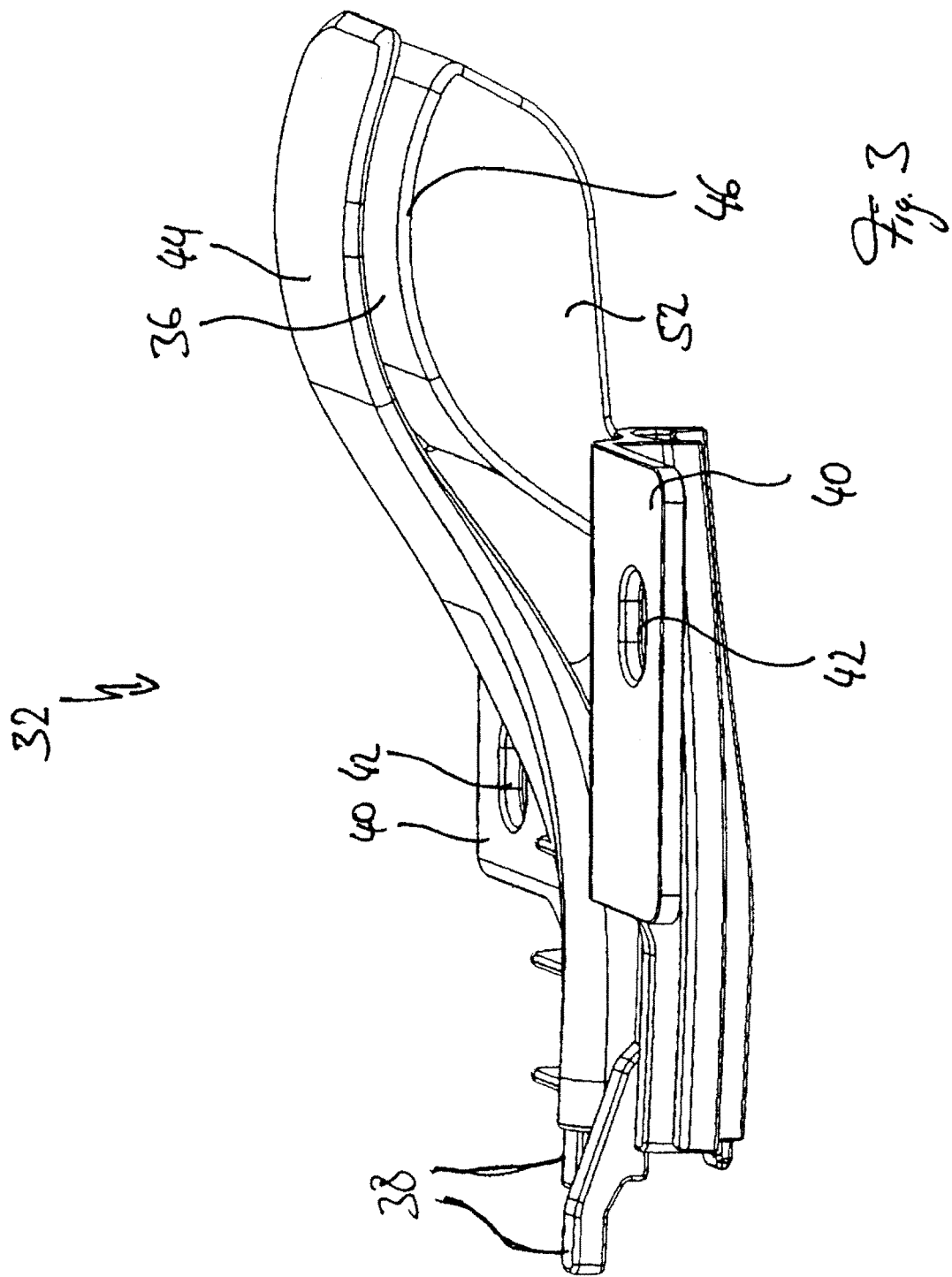
FIG. 3 is a perspective illustration of a tail-side attachment of the guide rail.
Figure 4:
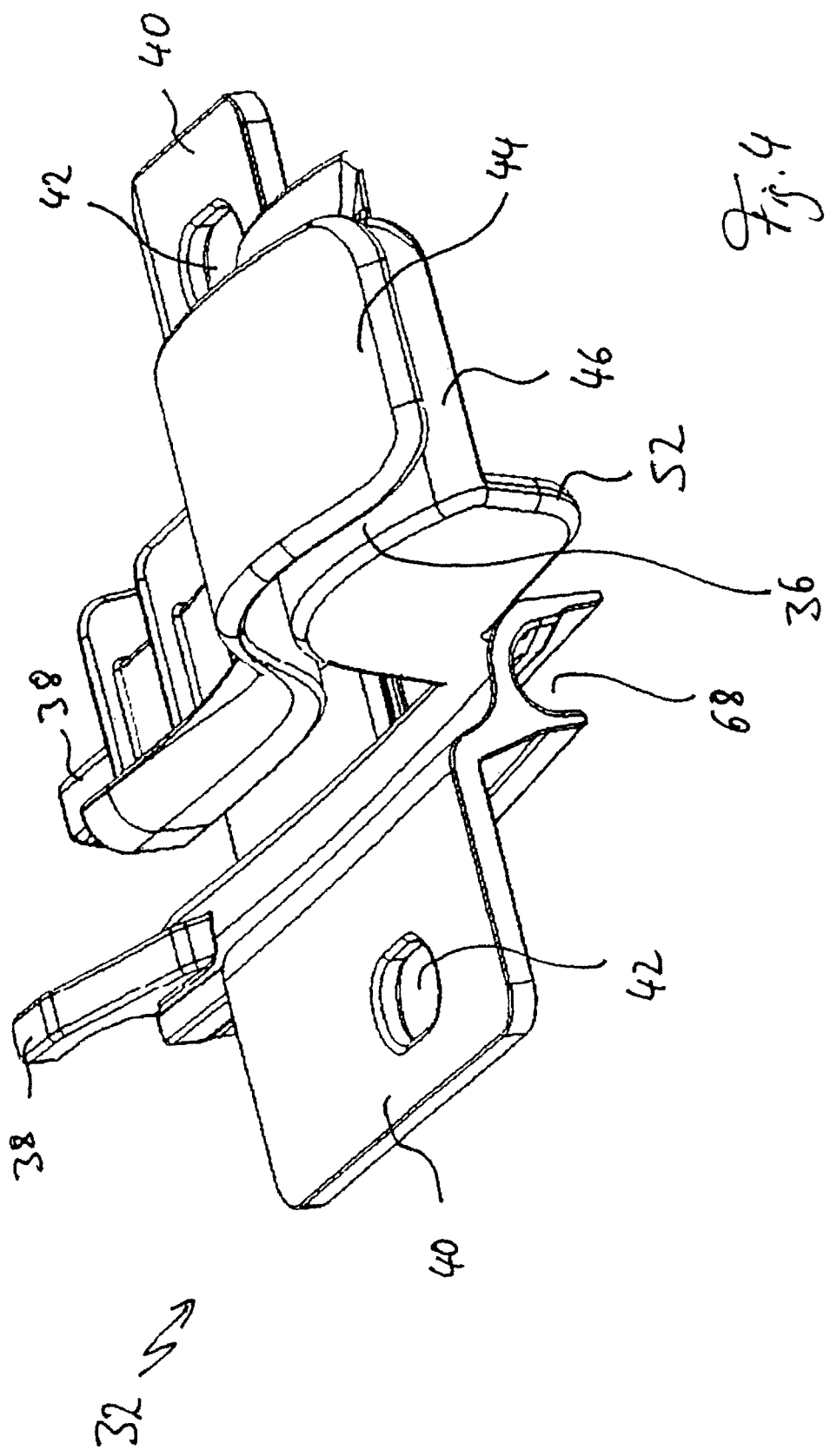
FIG. 4 is a further perspective illustration of the attachment.
Figure 5:
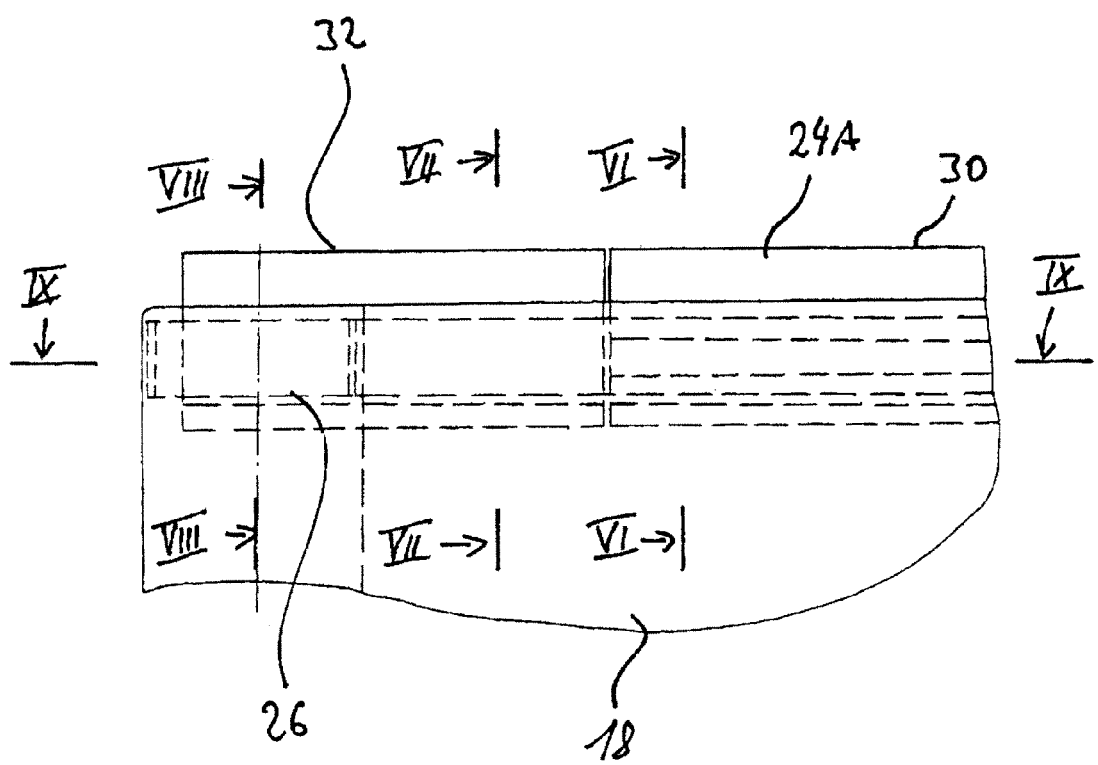
FIG. 5 is a plan view onto the winding region of the guide rail according to FIG. 2.

The attachment 32, which is shown in isolation in FIGS. 3 and 4, has on its side facing the straight guide rail portion two positioning pins 38 which can be inserted into corresponding recesses or channels of the straight guide rail portion 30, so that the portion of the guide track 36 that is arranged within the attachment 32 is aligned with the portion of the guide track 36 that is arranged within the straight guide rail portion 30.

For fixing to the roof construction or vehicle construction, the attachment 32 has on the outside and inside, based on the longitudinal center plane of the vehicle, in each case a fixing lug 40 which is provided with a slot 42 by means of which the attachment 32 can be screwed to the vehicle construction.

The guide track 36, which extends, viewed in the longitudinal direction of the vehicle, beyond the position of the winding axis 36 of the winding body 22, is delimited at the top, i.e. on the outside based on the winding axis 34, by an outer or upper shell 44 and at the bottom, i.e. on the inside based on the winding axis 34, by an inner or lower shell 46. The outer shell 44 and the inner shell 46 are in each case curved in such a way that the guide track 36 has, in the region of the attachment 32, a course which is substantially S-shaped in the vertical direction of the vehicle. The curvature of the guide track 36 runs, in the region of its free, tail-side end side, in the same direction as the winding of the winding body 22. This curvature promotes and facilitates the winding-up behavior of the constant force spring 26 and thus that of the blind sheet 18. The apex of the curvature, which is oriented in the same direction as the winding of the winding body 22, is indented with respect to the tail-side end side in the direction of the straight guide rail portion 30. As a result, it is possible to hold the axis 34 of the winding body 22 without further auxiliary means, such as a winding core or the like, at the level of the attachment 32 and thus at the level of the guide rail 24A. The S-shaped curvature of the guide track 36 in the region of the attachment 32 also allows an optimized use of the overall space available in the region of the vehicle roof 12. The saving of overall space can, in turn, benefit the height of the vehicle interior arranged below the blind arrangement 16.

The outer shell 44 of the attachment 32 is aligned, in the region of its leading end side, with an upper web 48 of the straight guide rail portion 30 and the upper side of the inner shell 46 is aligned with the upper side of a lower web 50 of the straight guide rail portion 30. The upper web 48 and the outer shell 44, on the one hand, and the lower web and the inner shell 46, on the other hand, delimit the guide track 36. The blind sheet 18 is struck in a U-shaped manner around the upper web 48 and the outer shell 44 in such a way that the constant force spring 26 is guided in the guide track 36 so as to be plane-parallel to the upper and lower delimiting surfaces of said guide track.

Figure 6:
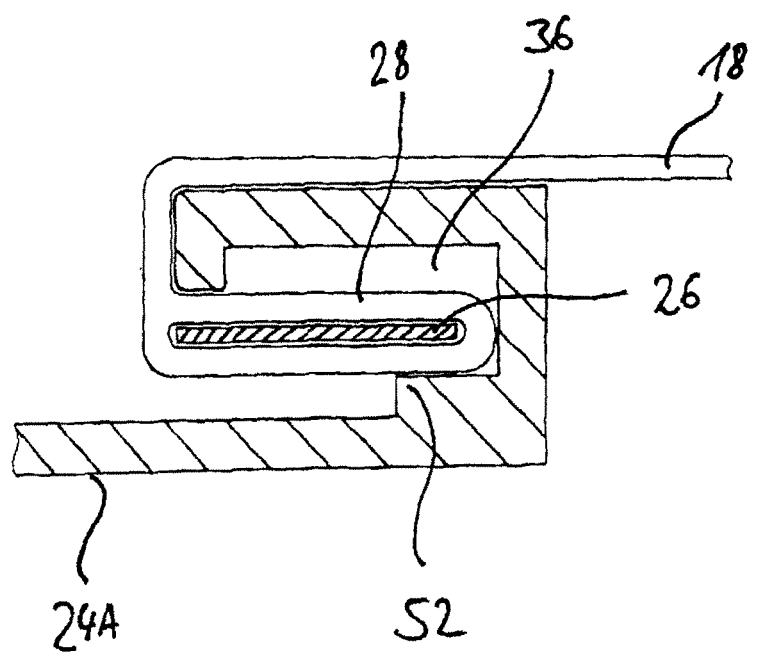
FIG. 6 is a section through the guide rail along the line VI-VI in FIG. 5.
Figure 7:
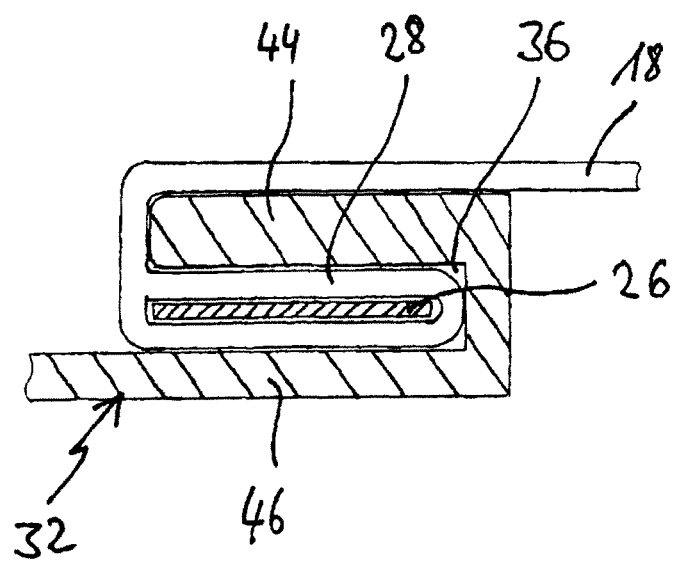
FIG. 7 is a cross section through the guide rail along the line VII-VII in FIG. 5.

As may be seen from FIG. 6, the pocket 28 or the constant force spring 26 rests, in the region of the guide rail portion 30, with its underside on a step 52 of the guide rail 24A. In the region of the attachment 32, the pocket 28 substantially abuts against the upper and the lower delimiting surface which are formed by the outer shell 44 and the inner shell 46 respectively of the attachment 32.

The thickness of the outer shell 44 of the attachment 32 decreases in the direction remote from the guide rail portion 30, i.e. in the direction of the vehicle tail. In order nevertheless to keep the blind sheet tensioned in the region of its winding body 22 in the transverse direction of the vehicle, the width of the outer shell 44 increases between the region adjoining the guide rail portion 30 and the tail-side end side, so that the edge of the outer shell 44 that is arranged on the outside based on the longitudinal center plane of the vehicle has a substantially S-shaped course based on the transverse direction of the vehicle. The external edge of the inner shell 46 runs, if appropriate, parallel to the edge of the outer shell 44 that is arranged on the outside.

Figure 8:
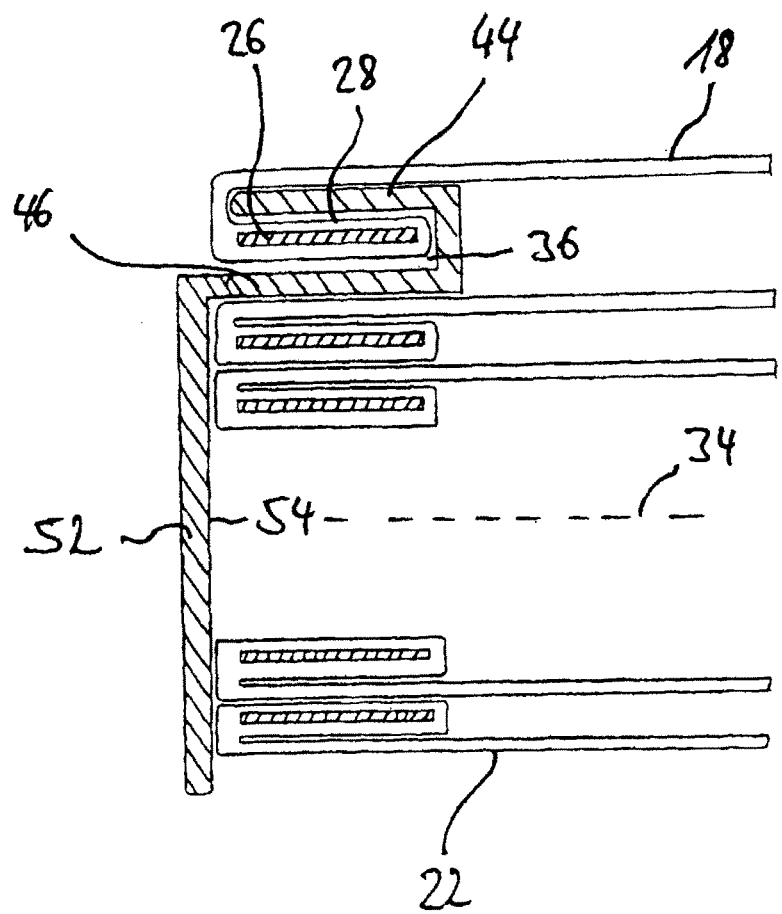
FIG. 8 is a section through the winding region along the line VIII-VIII in FIG. 5.
Figure 9:
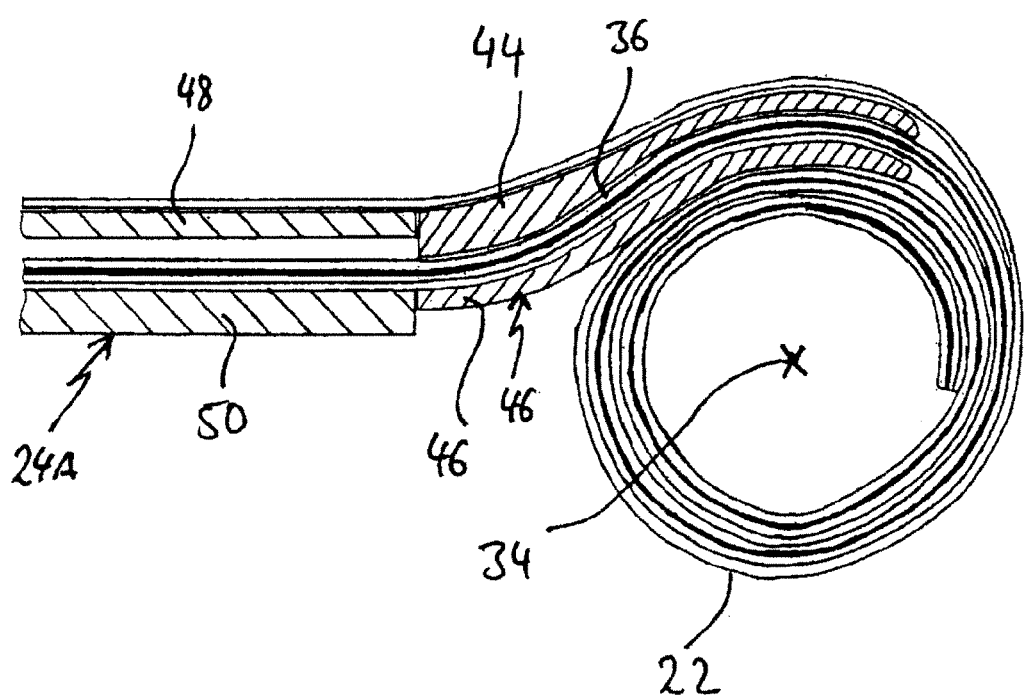
FIG. 9 is a longitudinal section through the guide rail along the line IX-IX in FIG. 5.

Furthermore, the attachment 32 has an abutment wall or side wall 52 which delimits, as may be seen from FIG. 8, the winding body 22 on the end side in the transverse direction of the vehicle and ensures a guide surface 54 for the region of the winding body 22 that has the constant force spring 26 and causes the winding of the blind sheet 18.

Figure 10:
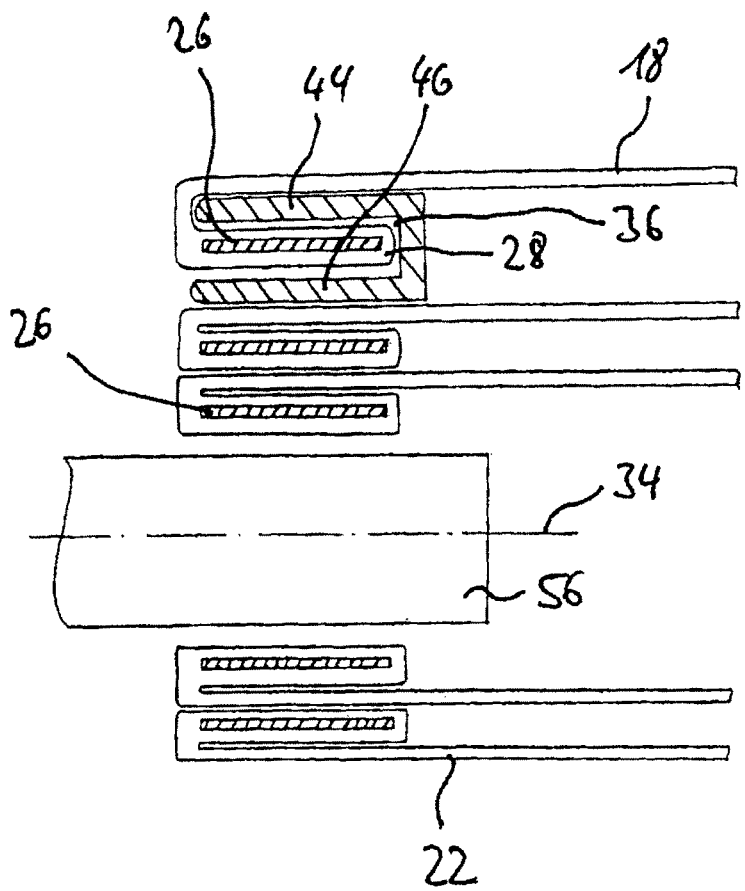
FIG. 10 shows an alternative embodiment of a winding region with a cylindrical bearing pin.

FIG. 10 shows a further embodiment of a blind arrangement of the type illustrated in FIGS. 1 to 9, in the winding region thereof. The blind arrangement corresponds substantially to that described hereinbefore, but differs therefrom in that there is provided, in the region of the tail-side attachment 32 of the guide rail 24A for winding up the constant force spring 26 as the winding core, a bolt or pin 56 which is rigidly connected to the tail-side attachment, is positioned in the winding axis 34 of the winding body 22 and ensures a defined winding-up of the blind sheet 18, in particular in the regions thereof having the constant force springs 26.

Figure 11:
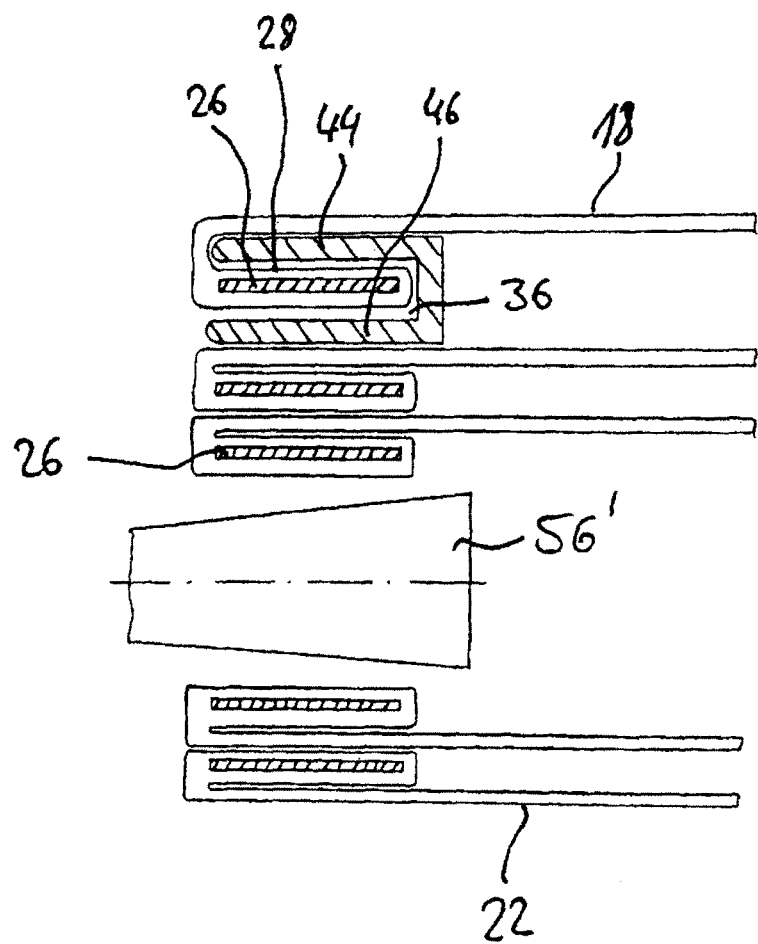
FIG. 11 shows a further alternative embodiment of a winding region with a conical bearing pin.

FIG. 11 shows a further embodiment of a blind arrangement of the type illustrated in FIGS. 1 to 9. This blind arrangement corresponds, again, substantially to that according to FIG. 10, but differs therefrom in that it has not a cylindrical bearing pin, but a conically widening bearing pin 56' for the edge region of the winding body 22 that has the constant force spring 26. This shape of the bearing pin 56' ensures that the internal windings of the blind sheet 18 do not slip in their edge regions in the direction of the longitudinal center plane of the vehicle.

Figure 12:
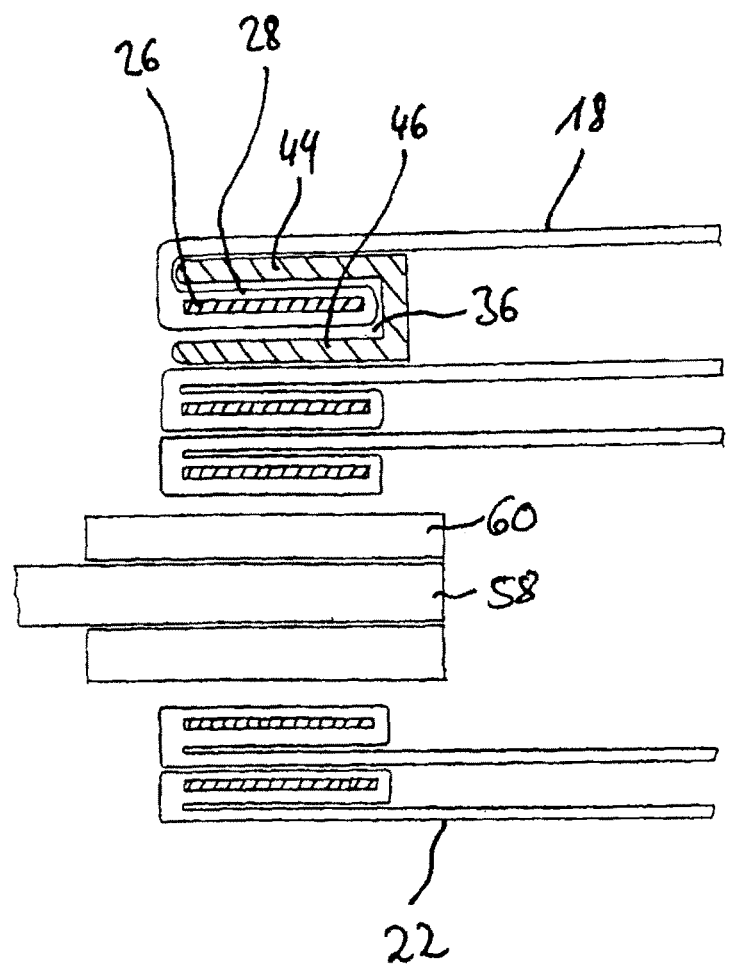
FIG. 12 shows a further alternative embodiment of a winding region with a rotatably mounted bearing sleeve.

FIG. 12 shows a further embodiment of a blind arrangement of the type illustrated in FIGS. 1 to 9 that corresponds, again, substantially to that according to FIG. 10, but differs therefrom in that it has not a bearing pin rigidly connected to the rear attachment 32, but a sleeve 60 which is rotatably mounted on a bolt 58 connected to the attachment 32 and on which the region of the winding body 22 that has the constant force spring 26 is wound up. The rotatably mounted sleeve 60 ensures a substantially friction-free winding-up of this edge region.

Figure 13:
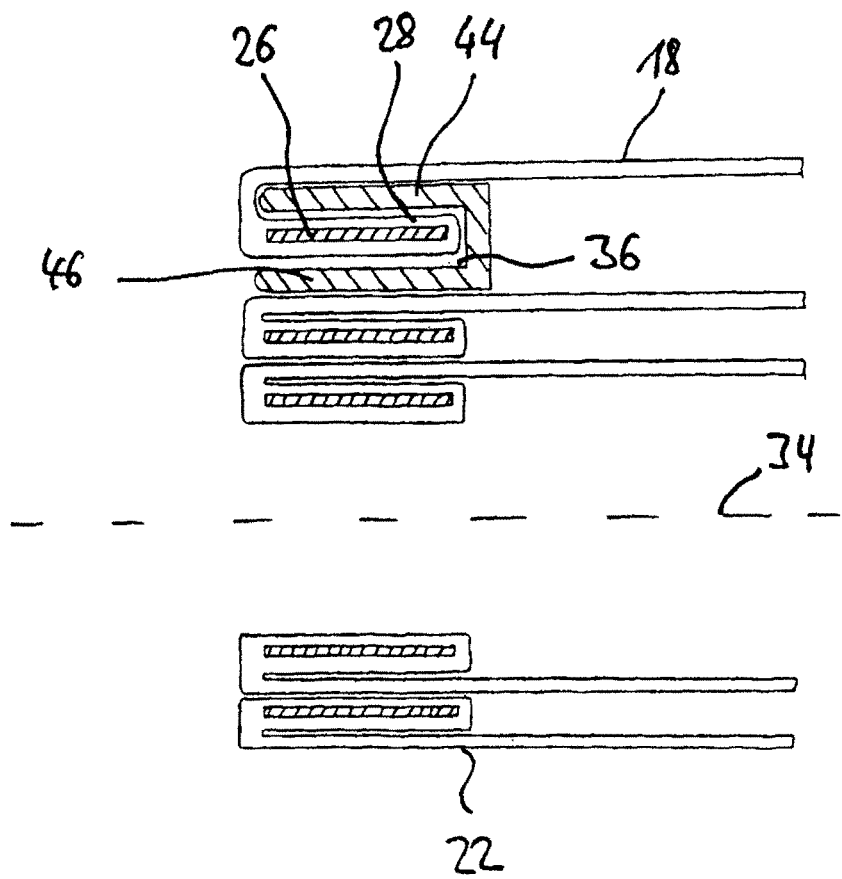
FIG. 13 shows an embodiment of a winding region without a lateral abutment surface for the winding body.

FIG. 13 shows a further embodiment of a blind arrangement of the type illustrated in FIGS. 1 to 9. This embodiment differs from those according to FIGS. 1 to 9 in that it does not have a lateral guide wall for the winding body 22. Instead, the winding body 22 is formed without abutment in its end sides when the blind sheet 18 is wound up.

Figure 14:
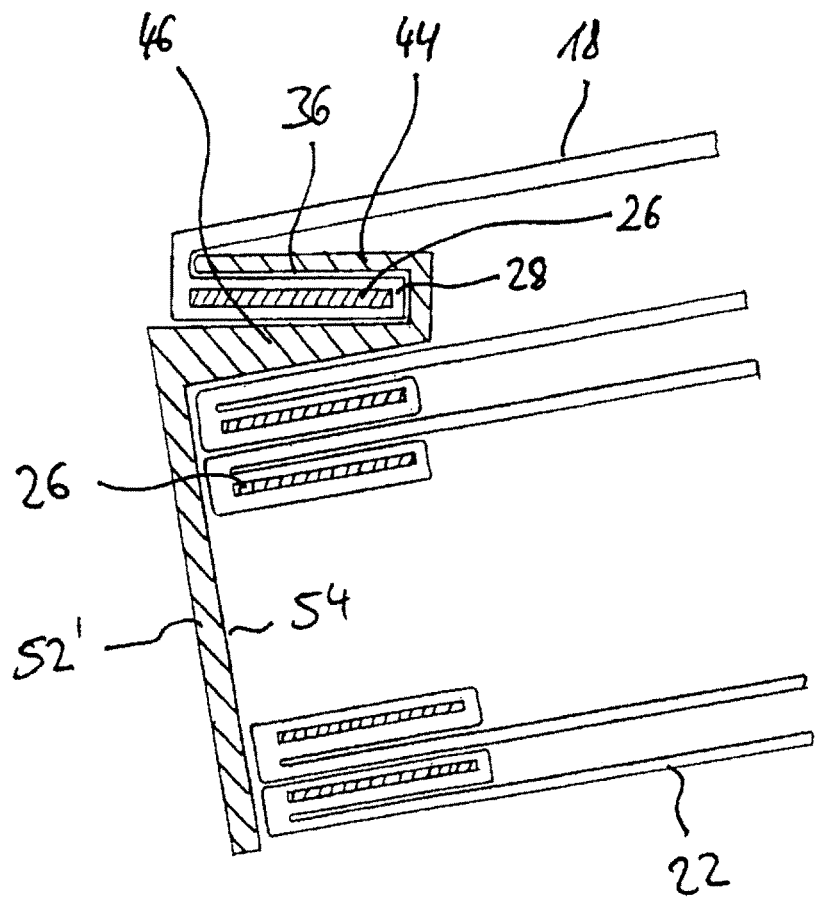
FIG. 14 shows an alternative embodiment of a winding region with a winding body which is curved in its embodiment.

FIG. 14 illustrates a further embodiment of a blind arrangement corresponding substantially to that according to FIGS. 1 to 9. However, the embodiment illustrated in FIG. 14 differs from that according to FIGS. 1 to 9 in that the tail-side attachment 32 has a side wall 52' which does not assume an angle of 90° in relation to the plane of the guide track 36, but is tilted in the direction of the longitudinal center plane of the vehicle. The normal of the abutment surface 54 is therefore pivoted upward. This means that the winding axis of the winding body 22 in the region of the constant force spring 26 does not point in the transverse direction of the vehicle, but is set in relation to a horizontal plane, so that a curvature of the winding body 22, and thus an arching of the blind sheet 18, is defined. The end sides of the winding body 22 of the blind sheet 18 are supported on both sides on symmetrically formed, obliquely set side walls 52'.

Figure 15:
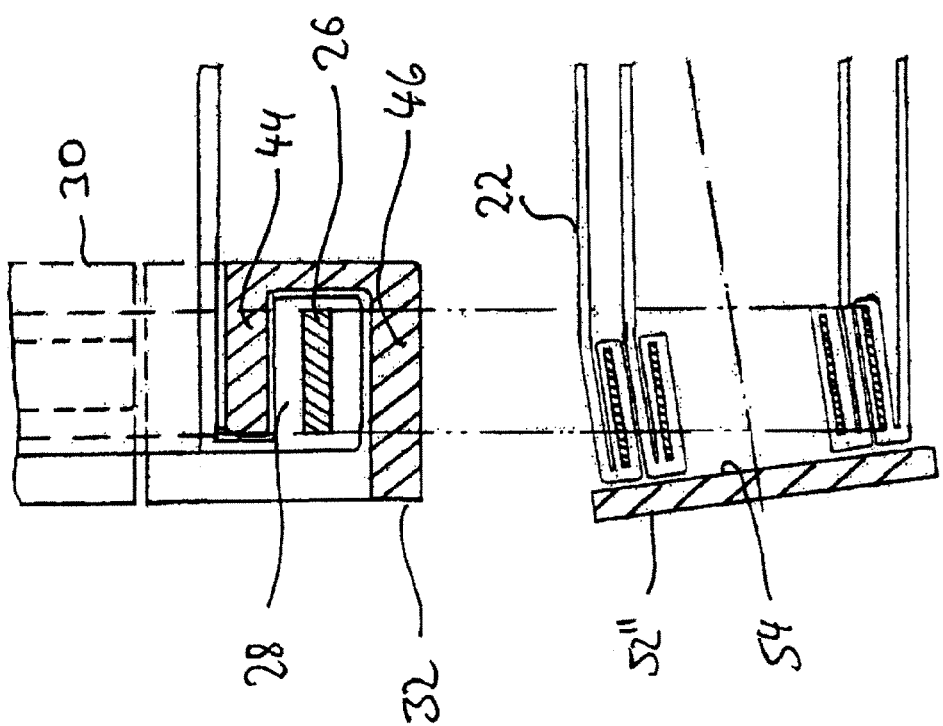
FIG. 15 shows a further alternative embodiment of a winding region with a winding axis, set in the direction of the front end of the vehicle, of a constant force spring.

FIG. 15 shows a further embodiment of a blind arrangement of the type illustrated in FIGS. 1 to 9. Again, this blind arrangement corresponds substantially to that according to FIGS. 1 to 9, but differs therefrom in that it has a side wall 52" which is tilted about a vertically arranged axis in the direction of the longitudinal center plane of the vehicle, by an angle of from approximately 1° to 10°. As a result, the blind sheet seeks to perform a conically outwardly running winding.

However, as the end side of the winding body 22 abuts against the side wall 52", the blind sheet is tensioned more effectively in the central regions positioned between the constant force springs 26. The axis of the inner surface of the inner shell 46 is oriented parallel to the surface normal of the abutment surface formed by the side wall 52".

Figure 16:
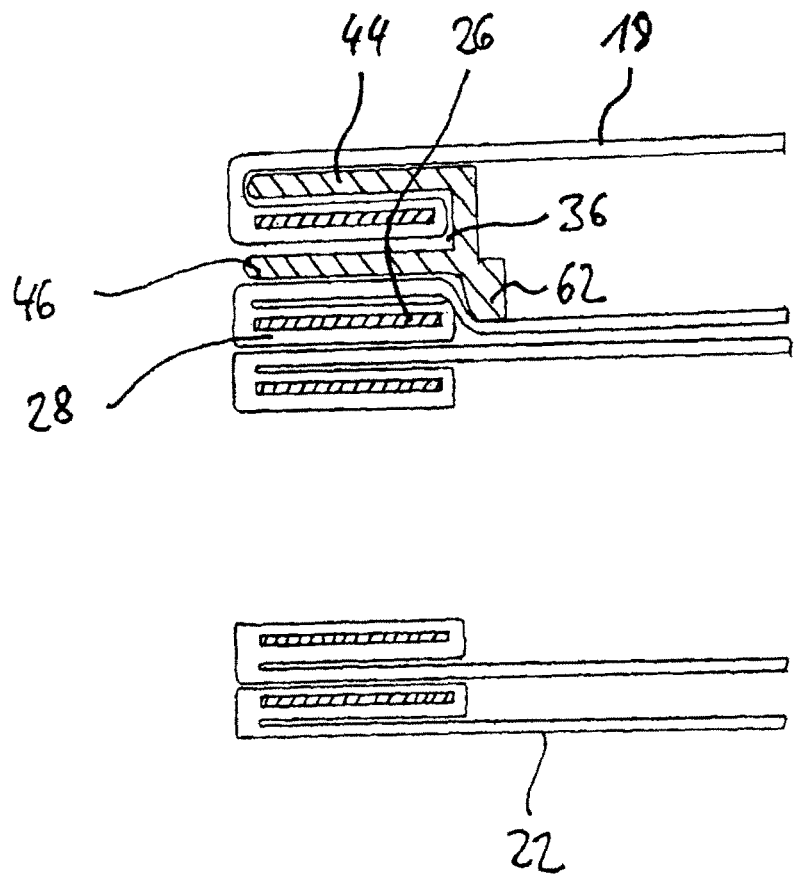
FIG. 16 shows a winding region of a blind arrangement with an inner support surface for a constant force spring winding.
Figure 17:
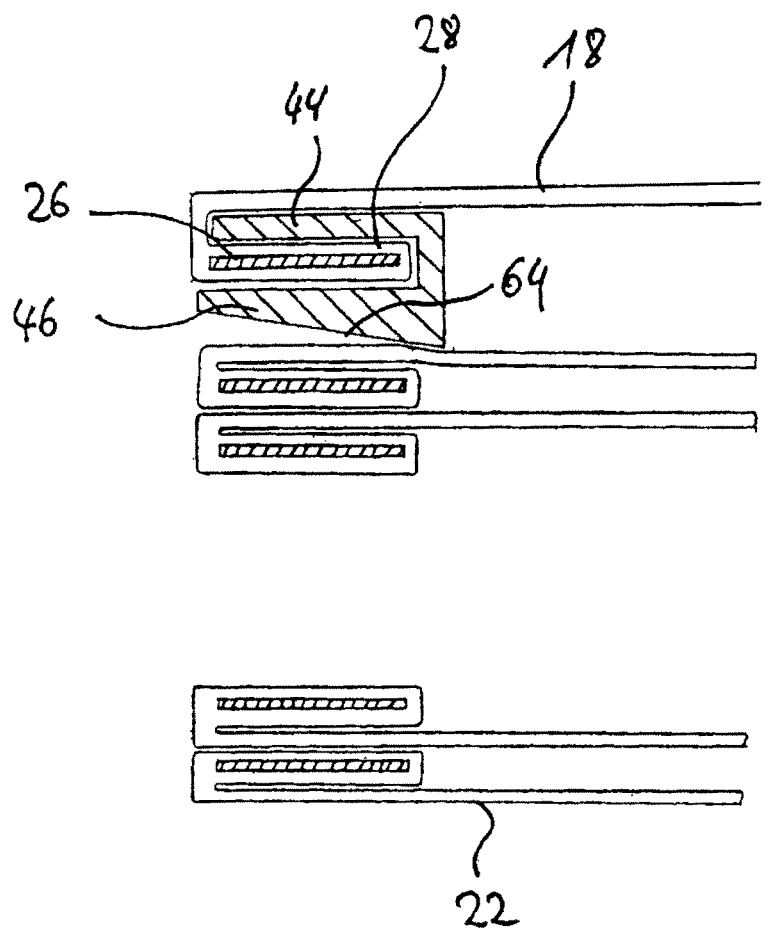
FIG. 17 shows a winding region of a blind arrangement with a support surface, in the form of a bevel or ramp, for a constant force spring winding.

FIG. 16 illustrates a further embodiment of a blind arrangement which corresponds substantially to that according to FIG. 13, but differs therefrom in that there is formed on the inner shell 46 of the tail-side attachment 32 on the inside a web or projection 62 which supports, based on the longitudinal center plane of the vehicle, on its inside a support surface for the region of the winding body 22 that has the constant force spring 26, so that the external windings under the inner shell 46 are held in the direction of the outside of the vehicle, thus ensuring a good winding behavior.

The embodiment illustrated in FIG. 15 of a blind arrangement according to the invention corresponds substantially to that according to FIG. 16, but differs therefrom in that the support surface is formed not by a projection, but by an inner shell 46 with a bottom delimiting surface 64 which descends obliquely in the direction of the longitudinal center plane of the vehicle. This arrangement causes the blind sheet within the winding body 22 to be kept tensioned also in the region of the internal windings, leading to an optimized winding behavior.

Figure 18:
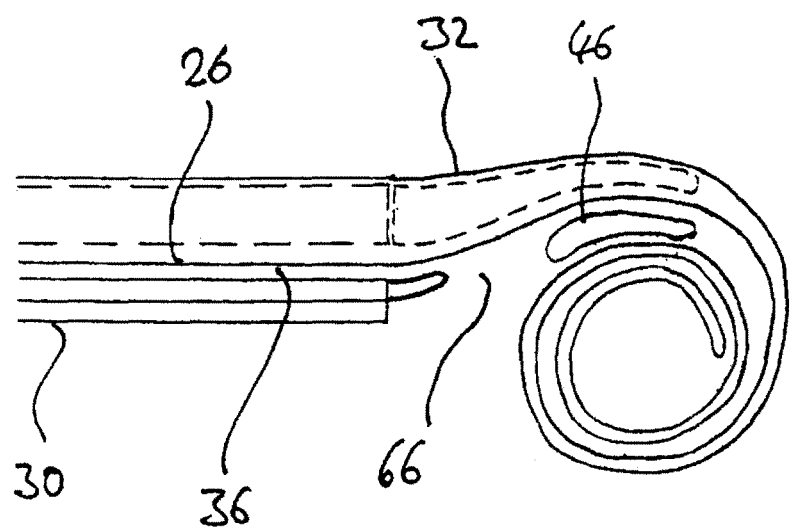
FIG. 18 is a side view of a further embodiment of a rear attachment of a guide rail.

FIG. 18 illustrates a further embodiment of a blind arrangement according to the invention which, again, corresponds substantially to that according to FIGS. 1 to 9, but differs therefrom in that the inner shell 46 of the tail-side attachment 32 of the guide rail 24A has an aperture 66 which extends in the longitudinal direction of the guide rail and allows, in the manufacture of the generally injection-molded attachment 32 which is made of plastics material, good demolding from the injection mold. It is of course also conceivable for the upper shell 44 to have a corresponding aperture for these reasons.

The straight guide rail shoulder 30 is generally formed from an aluminum extruded profile.

In alternative embodiments (not shown in greater detail), the winding body, i.e. the winding axis of the winding body, can also be arranged above the tail-side attachment of the guide rail. The guide track 36 can also provide in the region of the tail-side attachment only a simple curvature which is oriented in the same direction as the winding of the winding body. Depending on the embodiment, the lower shell and/or the upper shell can be omitted in order to gain overall space.

It is also conceivable for the guide rails of the blind arrangement according to the invention to be manufactured in one piece and have a tail-side end region embodied so as to correspond to the tail-side attachment described hereinbefore.

LIST OF REFERENCE NUMERALS

10 motor vehicle
12 vehicle roof
14 roof cutout
16 blind arrangement
18 blind sheet
20 pulling bow
22 winding body
24A, B guide rail
26 edge stiffener
28 edge pocket
30 guide rail portion
32 attachment
34 winding axis
36 guide track
38 positioning pin
40 fixing lug
42 slot
44 outer shell
46 inner shell
48 web
50 web
52 side wall
54 guide surface
56 bearing pin
58 bolt
60 sleeve
62 projection
64 delimiting surface
66 aperture
68 guide channel

The invention claimed is:

1. A blind arrangement for a motor vehicle, the blind arrangement comprising:
    at least one blind sheet comprising along each of two opposed lateral edge regions of the blind sheet a guide strip that comprises a constant force spring, extends along a direction of extension of the blind sheet, is guided in a guide track of a guide rail that extends in the direction of extension, tensions the blind sheet transversely to the direction of extension, and shapes the blind sheet into a winding body after leaving the guide track, wherein:
    the winding body has a winding axis that extends transversely to the direction of extension of the blind sheet and the winding body is at least partially arranged, at a level the same as or below a level of the guide tracks, the level of the winding body being a longitudinal extension of the guide rails, and the guide tracks are arranged on both lateral sides of the blind sheet,
    each guide track is formed at a level of the winding axis on an attachment of the guide rail that is arranged at one end of a substantially straight guide rail portion, and each attachment has, at least at the level of the winding axis, an inner shell based on the winding axis and an outer shell based on the winding axis, said inner and outer shells delimiting the guide track at the level of the winding axis and corresponding to webs that delimit the guide track in a region of the substantially straight guide rail portion, the lateral guiding of the blind sheet in the guide tracks extending to the level of the winding axis, and
    the inner and outer shells of each attachment tension the blind sheet transversely to the direction of extension at the level of the winding axis.

2. The blind arrangement as claimed in claim 1, wherein each guide track comprises a guide surface that is curved in the direction of extension in a winding direction, the guide surface carrying the blind sheet portion before the blind sheet portion adjoins the winding body, the curvature of the guide surface being in the same direction as a winding of the winding body.

3. The blind arrangement as claimed in claim 1, wherein the attachment has positioning pins via which the attachment is connected to the substantially straight guide rail portion.

4. The blind arrangement as claimed in claim 1, wherein the attachment has at least one fixing lug by which the attachment can be fixed to a vehicle construction.

5. The blind arrangement as claimed in claim 1, wherein the attachment has a guide channel for a drive cable of a roof opening system, which guide channel is aligned with a guide channel on the substantially straight guide rail portion.

6. The blind arrangement as claimed in claim 1, wherein the inner and outer shells of each attachment face outwardly away from a longitudinal axis of the blind sheet, the longitudinal axis being oriented in the direction of extension, and wherein the inner and outer shells of each attachment define a slot that receives a respective guide strip.

7. The blind arrangement as claimed in claim 1, wherein each guide strip is disposed in a respective slot defined by the inner and outer shells of each attachment.

8. The blind arrangement as claimed in claim 1, wherein the inner shell has, in a region facing a longitudinal center plane of the vehicle, a support surface for the region of the winding body that has the constant force spring.

9. The blind arrangement as claimed in claim 8, wherein the support surface is formed from a bevel formed on the inner shell.

10. The blind arrangement as claimed in claim 8, wherein the support surface is formed on a projection formed on the inner shell.

11. The blind arrangement as claimed in claim 1, wherein the attachment has a lateral abutment surface for the corresponding edge region of the winding body.

12. The blind arrangement as claimed in claim 11, wherein a line normal to the abutment surface is set in relation to the transverse direction of the vehicle in the direction of the front end of the vehicle so that an arching of the winding body is defined.

13. The blind arrangement as claimed in claim 12, wherein the line normal to the abutment surface is set in relation to the transverse direction of the vehicle in the direction of a front end of the vehicle by 1° to 10°.

14. The blind arrangement as claimed in claim 12, wherein the line normal to the abutment surface is set in relation to the transverse direction of the vehicle in the direction of the front end of the vehicle in the vertical direction.

15. The blind arrangement as claimed in claim 1, wherein a winding element for the winding body is provided in the region of the winding axis.

16. The blind arrangement as claimed in claim 15, wherein the winding element comprises a rotatably mounted element in the region of the force spring.

17. The blind arrangement as claimed in claim 16, wherein the rotatably mounted element is a sleeve mounted on a bolt.

18. The blind arrangement as claimed in claim 15, wherein the winding element is a bolt.

19. The blind arrangement as claimed in claim 18, wherein the bolt has an end element for guiding the force spring.

20. The blind arrangement as claimed in claim 18, wherein the bolt is frustoconical.

* * * * *